(12) United States Patent
Mano (10) Patent No.: US 7,127,162 B2
(45) Date of Patent: Oct. 24, 2006

(54) CAMERA MODULE

(75) Inventor: Nobuyuki Mano, Tokyo (JP)

(73) Assignee: SMK Corporation, Tokyo (JP)

( * ) Notice: Subject to any disclaimer, the term of this patent is extended or adjusted under 35 U.S.C. 154(b) by 168 days.

(21) Appl. No.: 10/996,305

(22) Filed: Nov. 23, 2004

(65) Prior Publication Data

US 2005/0220453 A1 Oct. 6, 2005

(30) Foreign Application Priority Data

Apr. 6, 2004 (JP) .............................. 2004-112282

(51) Int. Cl.
*G03B 13/32* (2006.01)
(52) U.S. Cl. ..................................... 396/144
(58) Field of Classification Search ................. 396/72, 396/79, 144, 529; 348/335, 345, 373–376; 359/823, 699–701
See application file for complete search history.

(56) References Cited

U.S. PATENT DOCUMENTS

| 5,289,320 A | * | 2/1994 | Kobayashi | ................... 359/819 |
| 5,970,262 A | * | 10/1999 | Tseng et al. | ................ 396/144 |
| 6,453,123 B1 | * | 9/2002 | Oshima | ....................... 396/79 |
| 6,639,730 B1 | * | 10/2003 | Muto et al. | .................. 359/694 |

* cited by examiner

*Primary Examiner*—W. B. Perkey
(74) *Attorney, Agent, or Firm*—Darby & Darby (57) ABSTRACT

A camera module having a lens unit; an intermediate part a hollow part of which the lens unit is affixed to; and a base unit which is opened in one direction and is equipped with a mounting part to which the intermediate part is mounted in such a way as to be able to rotate freely; wherein a latching protrusion that latches with the base unit is provided on an outer periphery of the intermediate part; a sliding hole having a movable step is provided on a mounting part side of the base unit; and the intermediate part moves in a direction perpendicular to the rotating direction, as the latching protrusion of the intermediate part rotates along the sliding hole of the base unit.

2 Claims, 9 Drawing Sheets

PRIOR ART

CAMERA MODULE

INCORPORATION BY REFERENCE

The present application claims priority under 35 U.S.C. §119 to Japanese Patent Application No. 2004-112282 filed on Apr. 6, 2004. The content of the application is incorporated herein by reference in its entirety.

TECHNICAL FIELD

The present invention relates to a camera module, more specifically, a camera module using light sensing elements used on such devices as cellular phones and digital cameras, in which the focusing distance is adjustable.

BACKGROUND OF THE INVENTION

Figure 12:
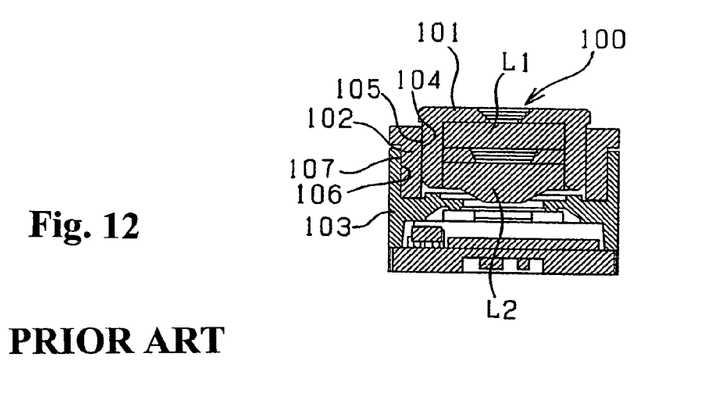
FIG. 12 is a cross-sectional description view of the prior art.

FIG. 12 illustrates a typical small camera module 100 used on a cellular phone equipped with a camera and other similar electronic devices comprises a lens module 101 containing lenses, an intermediate part 102 provided on the outside of the lens module 101, and a base 103 on which the intermediate part 102 equipped with the lens module 101 is mounted.

The lens module 101 is formed in a cylindrical shape, and contains a lens L1 and a lens L2 inside. A screw thread 104 is formed on the cylindrical surface of the lens module 101.

The intermediate part 102 is a ring-like part and a screw thread 105 that fit with the lens module 101 is provided on its internal cylindrical surface. The engagement between this screw thread 105 and the screw thread 104 of the lens module 101 accomplishes the assembling of the lens module 101 into the intermediate part 102. Furthermore, a screw thread 106 is provided on the outer cylindrical surface of the intermediate part 102 as well.

The base 103 provides a cylindrical space, in which a screw thread 107 is provided to engage with a crew thread 106 of the intermediate part 102, and a light receiving unit 108 is affixed to the bottom of the cylindrical space. The intermediate part 102 carrying the lens module 101 is mounted on the base 103 as the screw 106 of the intermediate part 102 is engaged with the screw thread 107 of the base 103.

The camera module 100 is normally shipped out from the factory after adjusting the focus so that an image of the lens module 101 can be focused properly on the light receiving unit 108 by means of the screw threads 106 and 107 of the intermediate part 102 and the base unit 103 respectively.

In order to use the camera module 100 utilizing its macro function, it is necessary to adjust the engagement condition of the screw threads 104 and 105 that unite the intermediate part 102 and the lens module 101 while using the equipment the camera module 100 is attached to.

To activate the macro function of the camera module 100, it is necessary to change its focal distance by moving the lens module 101 inside the intermediate part 102. However, this causes the pitch of the screw threads 104 and 105 that unite the lens module 101 and the intermediate part 102 to be too fine as overall compacting of the camera module 100 is demanded, which forces the lens module 101 and the intermediate part 102 to be smaller, thus preventing the screw threads 104 and 105 from having a coarser pitch.

Consequently, a large rotary angle of the lens module 101 is required in order to relocate it relative to the intermediate part 102 for changing from the normal use condition to the macro use condition. This causes a problem in that it is difficult to provide the macro function of the micro camera module 100 when used on devices such as cellular phones. More specifically, the problem is that it is, practically speaking, impossible to switch from the normal to macro condition on a compact camera module 100 with as screw pitch of 0.3 mm or so as it requires a rotary angle of half a revolution (180°) to one revolution (360°) in order to achieve a switching distance of 0.15 mm to 0.3 mm. Any attempt to use a larger screw thread form to minimize the required rotary angle would end up in a problem that a larger pitch screw thread means a larger thread height, thus defeating the intention of minimizing the overall size of the camera module.

SUMMARY OF THE INVENTION

The present invention provides a means of achieving a camera module with a macro function by providing a camera module that includes a lens unit containing lenses to allow light to enter from one end, refract it, and pass it through to an opposite end; an intermediate part formed in a cylindrical shape open on both ends holding the lens unit in the middle; and a base unit with an open end on one side being equipped with a mounting part which allows the intermediate part to be mounted in a freely rotatable manner. Further, a latching protrusion, which is to latch with the base unit, is provided on the outer cylindrical surface of the intermediate part and a slide hole has a step, to which the latching protrusion provided on the intermediate part is movably fitted, is provided on the mounting part sidewall of the base unit. The intermediate part can move relative to the base unit in a direction perpendicular to the rotary movement's direction as the latching protrusion of the intermediate part moves along the slide hole of the base unit.

Furthermore, the invention provides a camera module with a lens unit containing lenses to allow light to enter from one end, refract it, and pass it through to an opposite end, an intermediate part formed in a cylindrical shape open on both ends holding the lens unit in its hollow part and a base unit with an open end having a mounting part which holds the intermediate part in a freely rotatable manner. A latching protrusion, to latch with the base unit, is provided on the outer cylindrical surface of the intermediate part, a slide hole, having a step and the latching protrusion is movably fitted thereon, is provided on a mounting part sidewall of the base unit. The intermediate part can move relative to the base unit in a direction perpendicular to the rotary movement's direction as the latching protrusion of the intermediate part moves along the slide hole of the base unit.

In the camera module, the latching protrusion, provided on the outer cylindrical surface of intermediate part to which the lens unit is affixed, latches with the slide hole provided on the base unit. In another embodiment of the invention, the latching protrusion, which is provided on the base unit, latches with the slide hole provided on the outer cylindrical surface of intermediate part to which the lens unit is affixed. In such a camera module, the intermediate part's position moves in a direction perpendicular to the rotary direction by the amount of the step in the slide hole due to the step provided in the slide hole as the intermediate part is rotated and the latching protrusion moves in the rotary direction inside the slide hole.

The macro function is realized by choosing said motion distance to be equal to the distance required for switching the camera module from the normal usage to the macro usage.

Since the lens unit in the camera module can be moved in the direction perpendicular to the rotary direction by a small rotary motion relative to the base unit, it is possible to obtain a large amount of displacement for the thread pitch of approximately 0.15 to 0.3 mm used on the typical camera module required for providing the macro function for the camera module.

DETAILED DESCRIPTION OF THE EMBODIMENTS OF THE INVENTION

A lens unit of the camera module consists of a cylindrical container made of a black or dark colored polymer resin and the lenses provided in the container, where the space between both sides of the lens unit is the light passage. A screw thread is provided on the outer cylindrical surface of the lens unit.

The intermediate part is formed into a cylindrical shape, a screw thread of the same standard as that of the lens unit is provided in the inner cylindrical surface, and latching protrusions are provided on the four sides of the outer cylindrical surface.

The lens unit is affixed to the inside of the intermediate part by fitting the screw thread formed on the outer cylindrical surface of the lens unit with the screw thread formed on the inner cylindrical surface of the intermediate part. The light path of the lens unit is the direction of both opened sides of the intermediate part when the lens unit is mounted on the intermediate part. An operating lever protrudes from one of the side's end of the intermediate part radially outward.

The base unit is a cylindrical object with one end being closed for providing a light receiving part, while the other end being open and the inner space formed between the two ends forms a mounting part in which an intermediate part is to be installed. Slide holes are formed on the four sidewalls of the mounting part that form the mounting part between the two ends in such a way as to face the protrusions provided on the intermediate part. Each slide hole has a step, one end of which is located on the side the light receiving part is located, while the other end is located on the opening side.

The intermediate part holding the lens unit therein is installed from the opening side into the mounting part of the base unit in such a way as to have the protrusions of the base unit fitted into the slide holes. The operating lever provided on the intermediate part extends outward from the opening side of the base unit at this time.

By having the intermediate part and the lens unit built into the base unit, the light path of the lens unit is defined as extending from the opening side of the base unit to the light receiving part installed in the base unit. By turning the intermediate part relative to the base unit by operating the operating lever of the intermediate part, the protrusions of the intermediate part moves inside the slide holes of the base unit and eventually reach the other ends via the steps. As a result of this rotary motion, the distance between the light receiving part provided in the base unit and the lens unit can be changed. The macro function of the camera module is achieved by choosing the distance from the light receiving part provided on the base unit to the lens unit to be a distance of 0.15 mm to 0.3 mm, which is required for the macro function.

Figure 1:
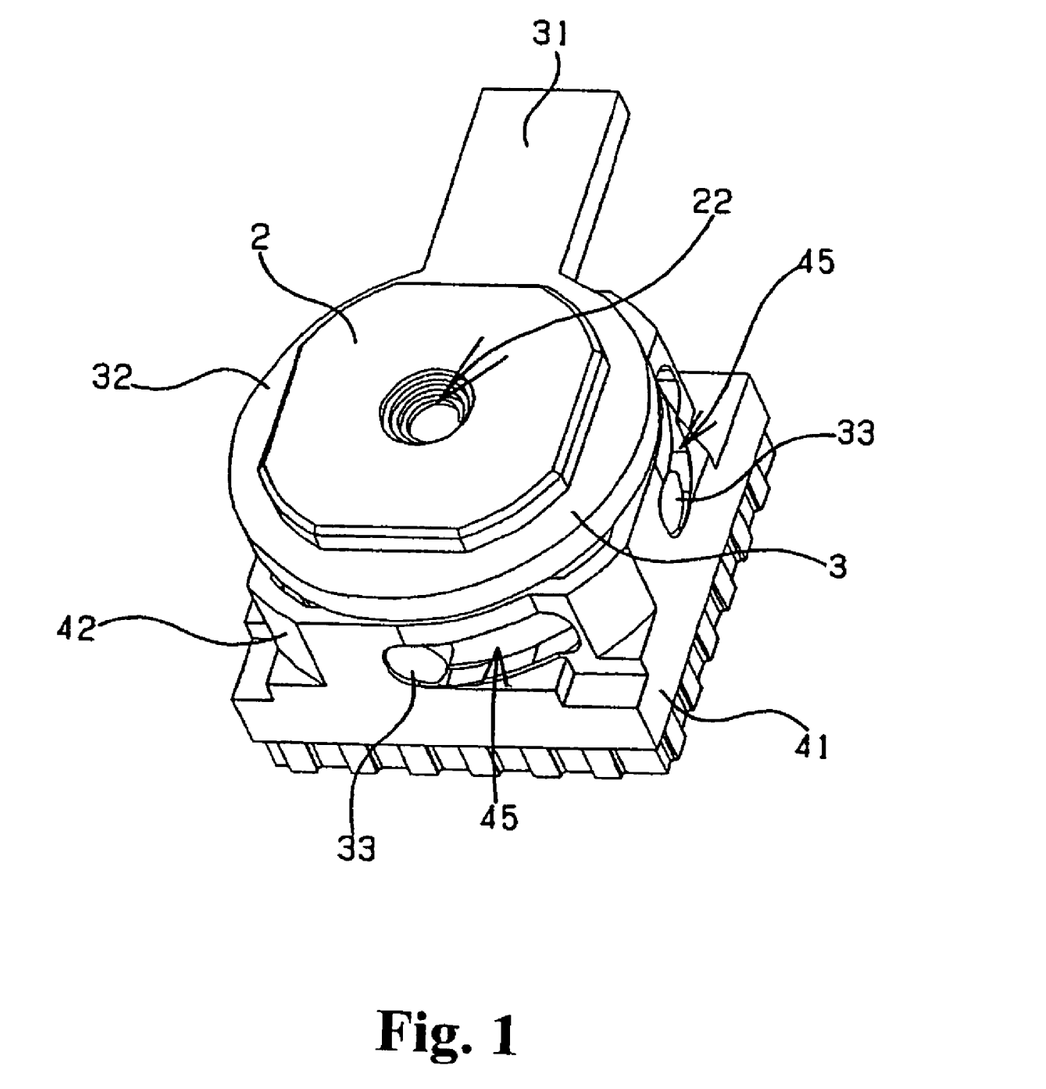
FIG. 1 is a perspective view of an embodiment of the invention.
Figure 2A:
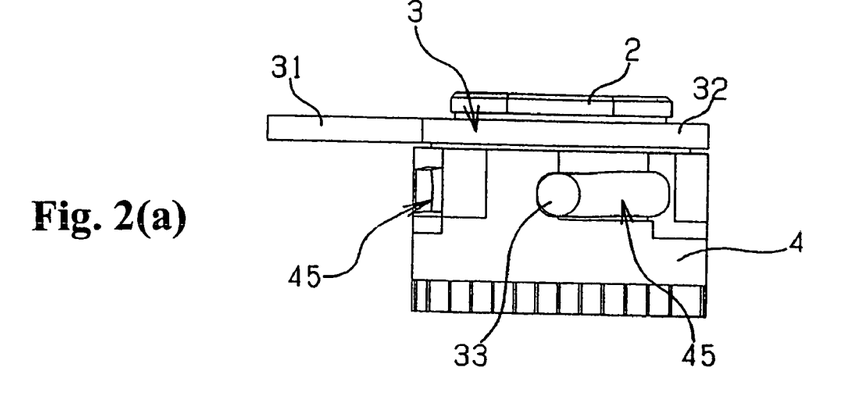
FIG. 2(a) shows a front description view of FIG. 1.
Figure 2B:
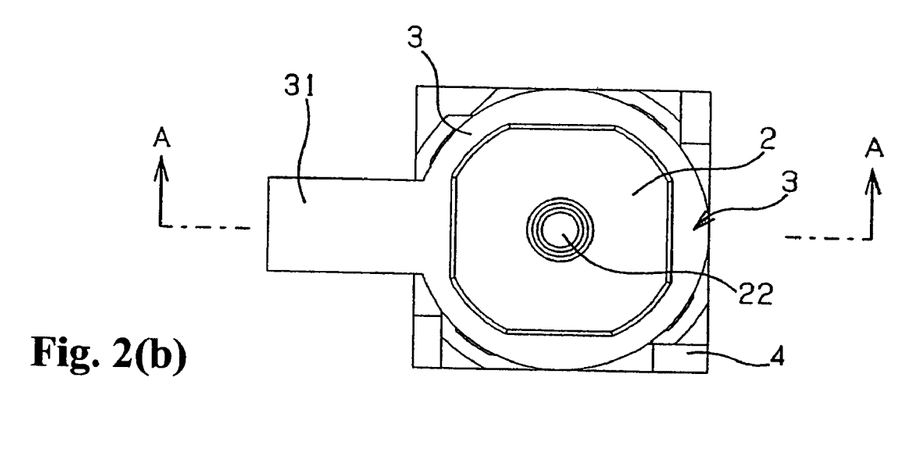
FIG. 2(b) shows a plan description view of the embodiment of FIG. 1.
Figure 2C:
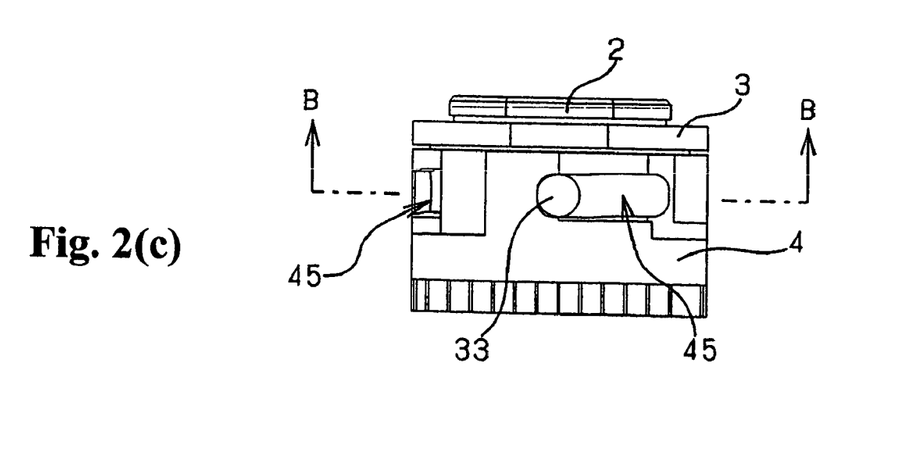
FIG. 2(c) illustrates left side description view of the present invention.
Figure 3A:
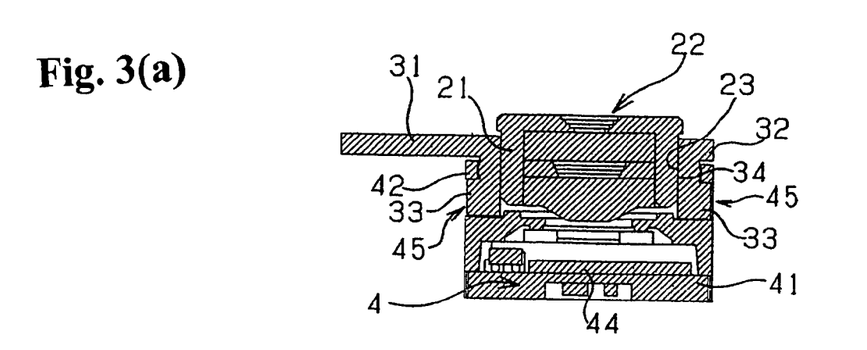
FIG. 3(a) is a view of line A—A which is a cross section of FIG. 1.
Figure 3B:
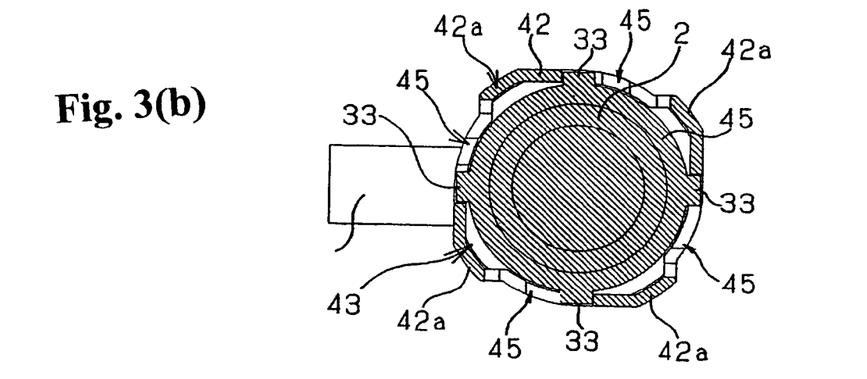
FIG. 3(b) is a cross-sectional view across line B—B cross.
Figure 4:
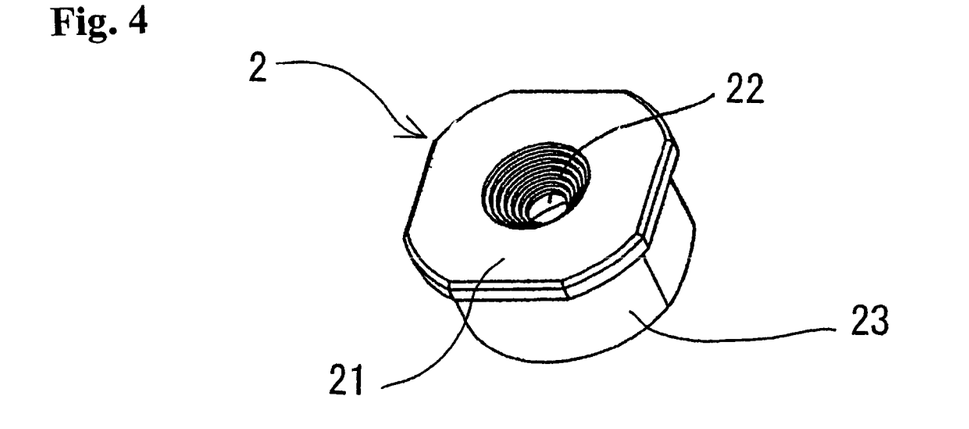
FIG. 4 is a perspective description view of the lens unit.
Figure 6:
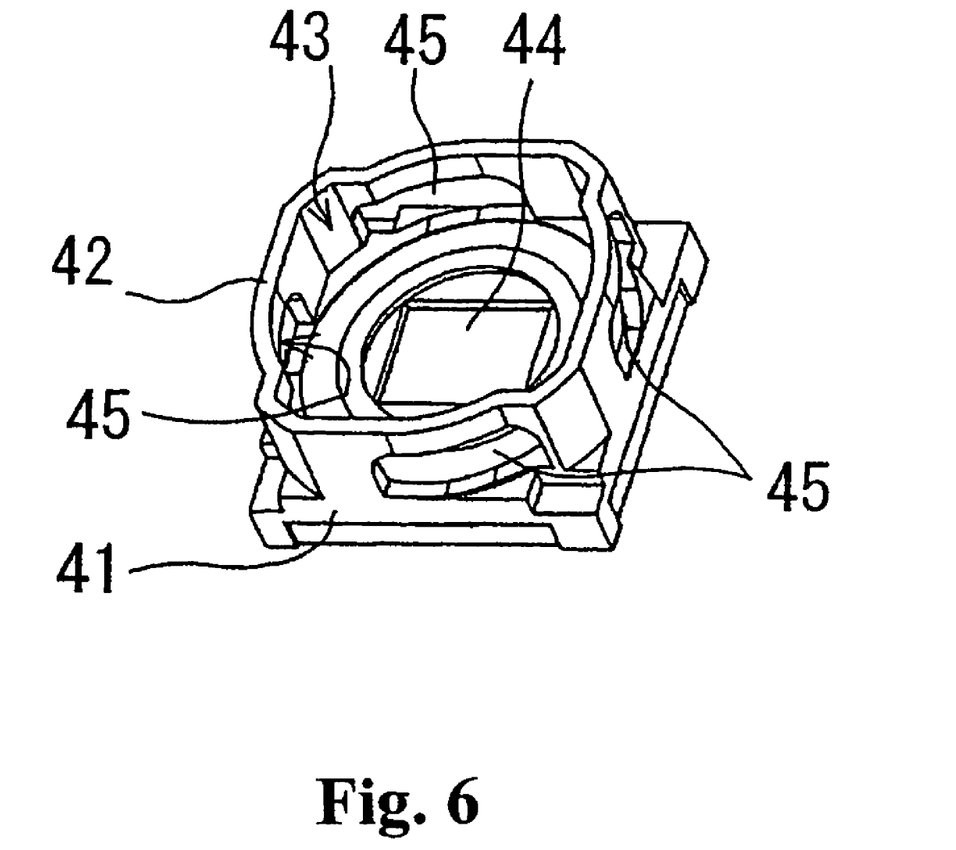
FIG. 6 is a perspective view of the base unit.
Figures 7A, 7B, 7C:
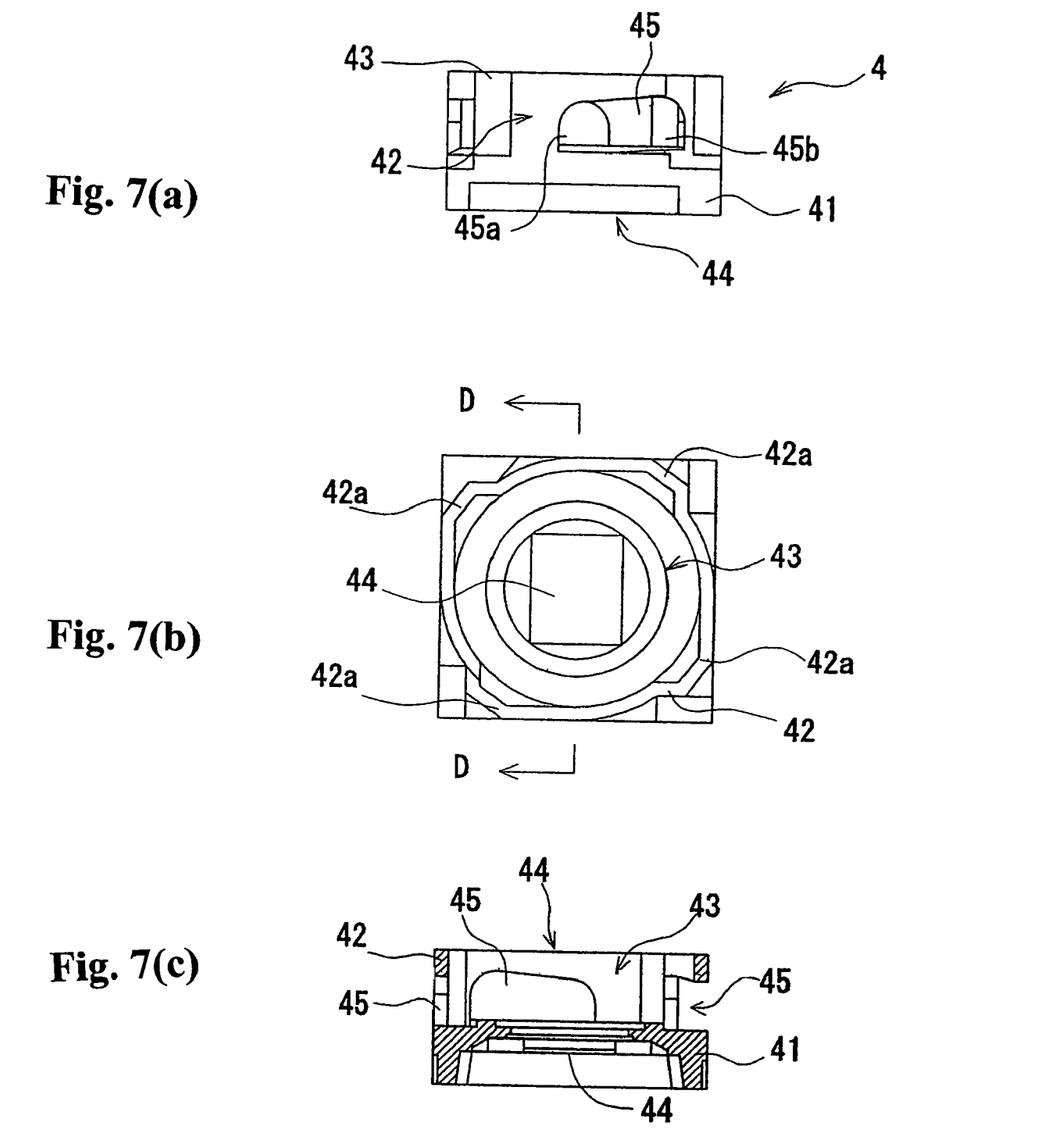
FIG. 7(a) illustrates a front description view of the base unit.
FIG. 7(b) illustrates a plan description view of FIG. 7(a)
FIG. 7(c) is a cross section description view across line D—D.
Figure 8:
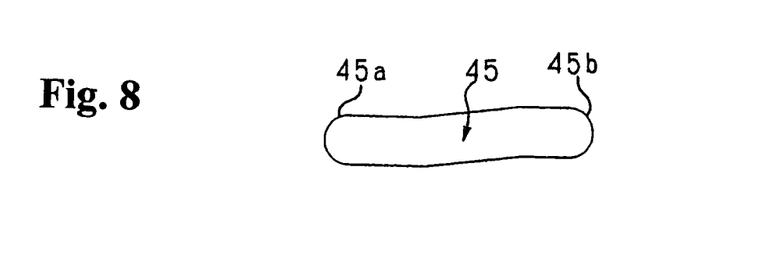
FIG. 8 is a description view of another example of the slide hole.
Figure 9A:
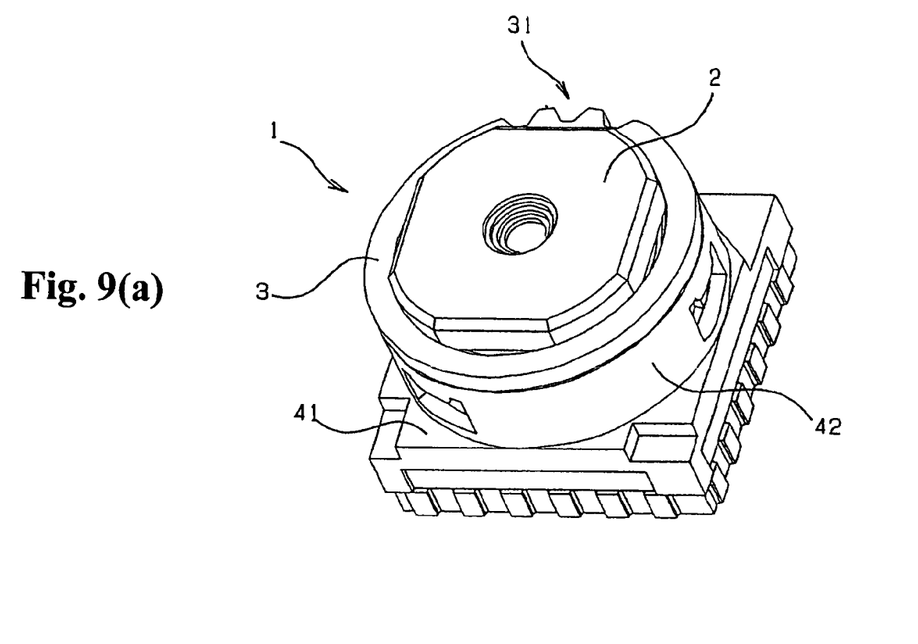
FIG. 9(a) shows a perspective view of a camera module having another embodiment.

An embodiment of the invention will be described in the following referring to the accompanying drawings. FIG. 1 is a perspective drawing of an embodiment of the invention, FIG. 2(a) is its front description view, (b) is its plan description view, and (c) is its left side description view, FIG. 3(a) is its cross-sectional view along the line A—A and (b) is its cross-sectional view along the line B—B, FIG. 4 is a perspective description view of the lens unit, FIG. 5(a) is a front description view of the intermediate part 3, (b) is its plan description view, and (c) is its cross-sectional view along the line C—C, FIG. 6 is a perspective description drawing of the base unit, FIG. 7(a) is a front description view of the base unit 3, (b) is its plan description view, and (c) is its cross-sectional view along the line D—D, FIG. 8 is a description drawing showing another example of the slide hole, FIG. 9(a) is a perspective view of another embodiment, (b) is its front description view, (c) is its front central vertical cross section description view, FIG. 10(a) is a perspective view of the intermediate part of another embodiment, (b) is its front description view, (c) is its plan description view, and FIG. 11 is a perspective view of the base unit of another embodiment.

The numeral 1 denotes a camera module, which is an embodiment of the invention. The camera module 1 comprises, as shown in FIG. 1 through FIG. 3, a lens unit 2 storing lenses and forming a light path, an intermediate part 3 mounted on the lens unit 2 to allow the lens unit 2 to be mounted on a base, and a base unit 4 for allowing the image, which has passed through the lens unit 2, to be formed by having a light receiving part and the intermediate part 3 installed thereon.

As shown in FIG. 1 through FIG. 4, the lens unit 2 has a lens L1 and a lens L2 provided in its cylindrically shaped hollow housing 21, and an incident hole 22 on an upper side of the housing 21. Also, a screw thread 23 is formed on the cylindrical surface of the lens module 2. The lens unit 2 refracts the light entering through the incident light hole 22 by means of the lens L1 and the lens L2, forming the light path to the opposite plane.

Figure 5A:
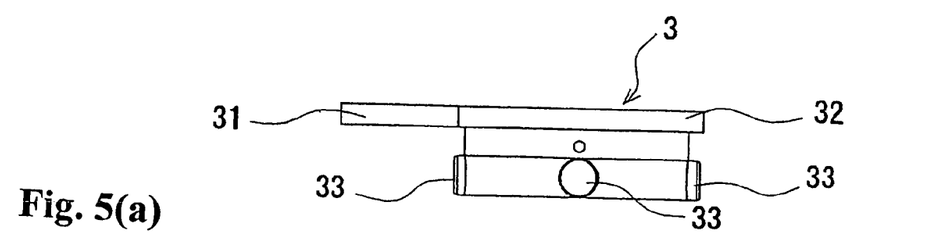
FIG. 5(a) shows a front description view of the intermediate part of the present invention.
Figure 5B:
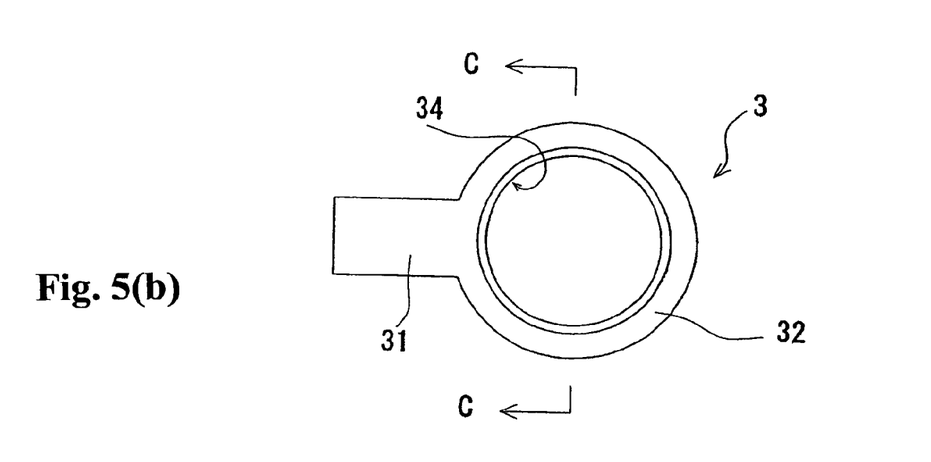
FIG. 5(b) is a plan description view of the intermediate part of FIG. 5(a)
Figure 5C:
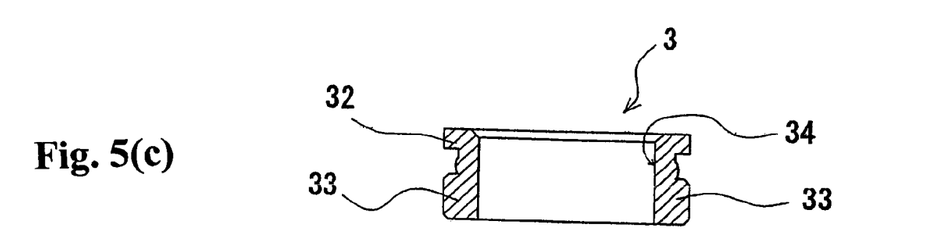
FIG. 5(c) is a cross section description view across line C—C.

The intermediate part 3 is formed as a cylindrical part with both ends opened to provide a hollow space 35, a flange part 32 extending outward, and an operating lever 31 radially outward from the flange 32 as shown in various drawings of FIG. 5. The cylindrical surface has latching protrusions 33 protruding on its four sides. The latching protrusions 33 also protrude radially from the cylindrical surface. A male screw thread 34 is formed on the inner cylindrical surface of the intermediate part 3. Since the male screw thread 34 has a thread pitch that is equal to that of the screw thread formed on the lens unit 2, and the inner diameter of the intermediate part 3 is identical to the outer diameter of the threaded part of the lens unit 2. The screw thread 23, the screw thread 23 of the lens unit 2 engages with the male screw thread 34, thus causing the intermediate part 3 to engage with the lens unit 2.

The positioning of the lens unit 2 relative to the intermediate part 3 (i.e., relative to the base unit 4) is determined by the amount of engagement between the screw thread 23 and the male screw thread 34.

The base unit 4 has a base part 41 having a substantially rectangular shape, a mounting part sidewall 42 erected above the base part 41, and a mounting part 43 formed in a surrounding shape with only one open end in the top section as shown in FIG. 6 and FIG. 7.

A light receiving unit 44 is provided in the middle of the base part 41 having a light receiving plane on a side the mounting part 43 is located. The light receiving part 44 operates with the photoelectric conversion method by causing an image to be focused on CCD elements but it is also possible to cause an image focused on a light sensitive device.

Slide holes 45 each consisting of an oblong hole are provided on the sidewall 42 of the mounting part 43 located above the base part 41 to allow latching protrusions 33 of the intermediate part 3 to move while being inserted thereto. In other words, the slide holes 45 are formed on the four sides of the mounting part sidewall 42. Each of these oblong slide holes 45 is located in such a way as shown in FIG. 7(a) that both ends 45a and 45b of the slide hole 45 are at different distances from the base part 41. The difference of these distances of both ends 45a and 45b from the base part 41 is chosen to be equal to the distance required to change the focal distance of the lens unit 2 from the normal usage to the macro usage. More specifically, the small lens unit 2 as is used in this embodiment can be typically switched to the macro function by changing the focal distance approximately 0.15 to 0.3 mm.

Also, the mounting part sidewall 42 of the base unit 4 has such a shape as shown in FIG. 6 or FIG. 7 that its inner diameter has four areas which bulge outward from a cylindrical shape, whose diameter is approximately equal to the cylindrical diameter of the intermediate part 3. Bulging parts 42a of the mounting part sidewall 42 form said bulging parts. The spaces provided by the bulging parts 42a of the mounting part 43 are formed in such a way that the intermediate part 3 is allowed to be inserted by having the latching parts 33 of the intermediate protrusions 3 located at diagonal positions matching the locations of the bulging parts 42a located diagonally with each other. Each bulging part 42a is placed in such a way that one end of each slide hole 45 matches with the location of the bulging part 42a. By having the bulging parts 42a in such a manner, the intermediate part 3 can be inserted toward the base part 41 by locating each of the latching protrusions 33 to match one of the bulging parts 42a respectively.

In the camera module 1 constituted as described above, the thread 23 of the lens unit 2 is engaged with the thread 34 of the intermediate part 3 to unite the lens unit 2 with the intermediate part 3.

Next, the latching protrusions 33 of the intermediate part 3, when united with the lens unit 2, are located to match the bulging parts 42a of the mounting part sidewall 42 of the base unit 4, and the united parts are then inserted into the mounting part 43. Once the latching protrusions 33 are located inside the sliding holes 45, one end of each of which is located in one of the bulging parts 42a, the intermediate part 3 is rotated slightly. Then the latching protrusions 33 engage with the slide holes 45, making the intermediate part 3 and the lens unit 2 to be latched with the base unit 4.

The focus adjustment is done in this condition by moving the lens unit 2 in the light path direction X by turning the lens unit 2 relative to the intermediate part 3 by means of the engagement between the screw thread 23 of the lens unit 2 and the male screw thread 34 of the intermediate part 3.

Thus the focusing of the lens unit 2 mounted on the base unit 4 is adjusted, while the latching protrusions 33 of the intermediate part 3 move inside the slide holes 45 as the operating lever 31 of the intermediate part 3 is turned. As the intermediate part 3 moves in the X direction of the light path by the amount of step existing between both ends of the slide hole 45 as the latching protrusions 33 move in the slide holes 45. Since the step is equal to the distance required for the camera module to be switched from the macro usage condition and the normal usage condition, the switching is effectuated by placing the operating lever 31 of the intermediate part 3 on either end of the slide hole 45.

The shape of the slide hole 45 provided in the base unit 4 is not limited to the one shown in FIG. 7(a) but can be a shape for positively guiding in the horizontal direction as shown in FIG. 8. Moreover, the width between both ends 45a and 45b of the slide hole 45 can be wider or narrower depending on the equipment the camera module 1 is to be installed, or can be arbitrarily designed as long as it can realize the motion of the lens unit 2 from the normal usage condition to the macro usage condition along the light path X direction with the motion of the slidably latched latching protrusion 33.

The number of slide holes 45 and the latching protrusions 33 can be four as described in the embodiment, but also three to five or any other number to be chosen depending on the strength and the equipment to which the unit is applied.

Next, another embodiment will be described below with reference to FIGS. 9 through 11.

Figure 9B:
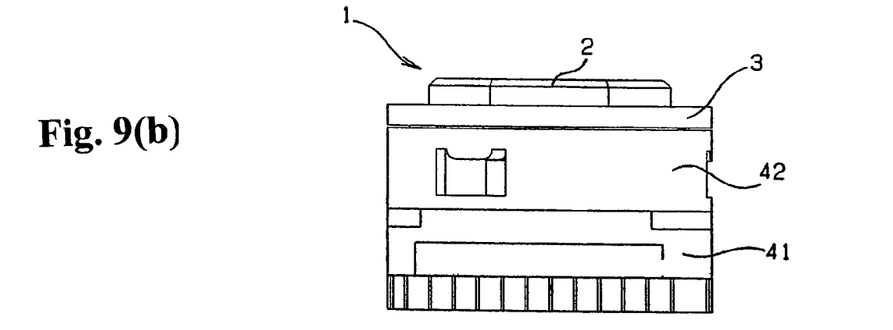
FIG. 9(b) illustrates a front description view of the embodiment of FIG. 9(a)
Figure 9C:
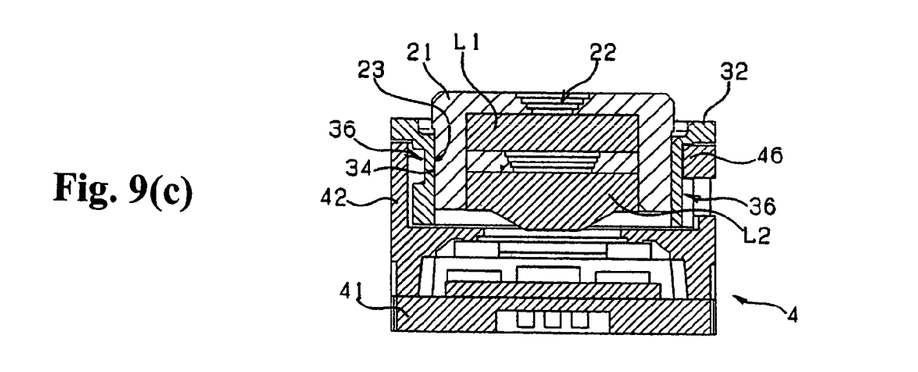
FIG. 9(c) illustrates a front center cross-sectional description view of the embodiment of FIG. 9(a)
Figure 10A:
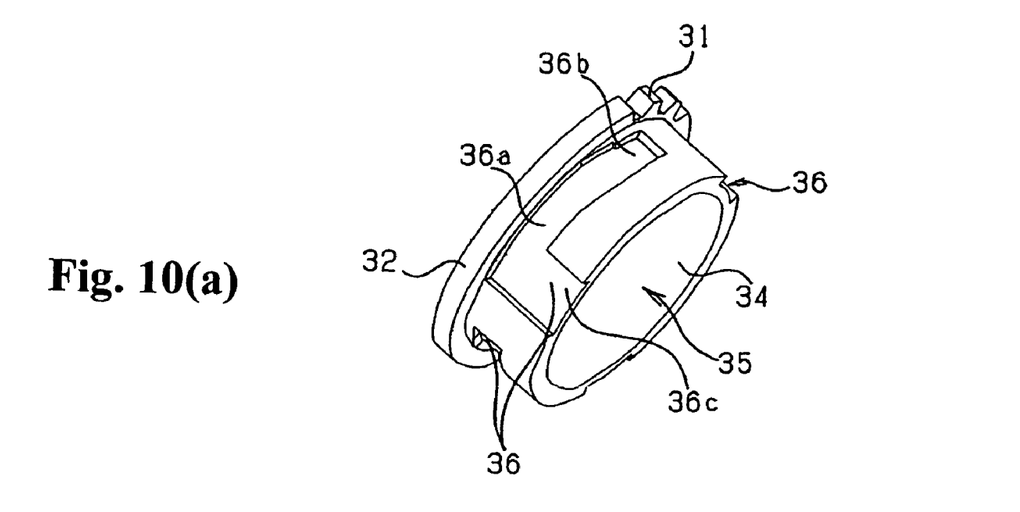
FIG. 10(a) shows a perspective view of the intermediate part of the other embodiment.
Figure 10B:
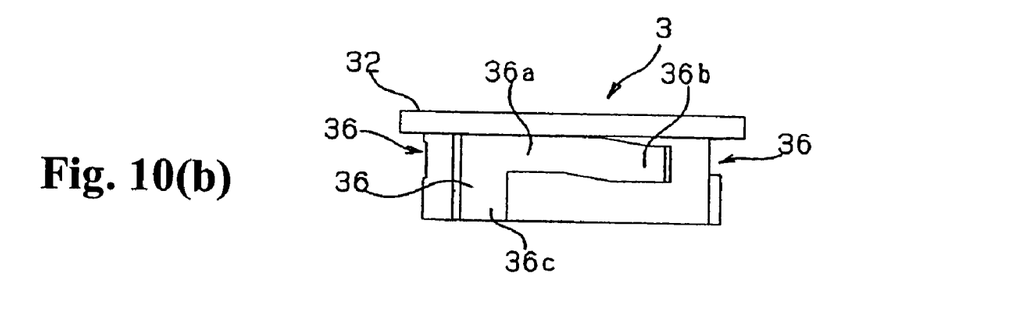
FIG. 10(b) illustrates a front description view of FIG. 10(a)
Figure 10C:
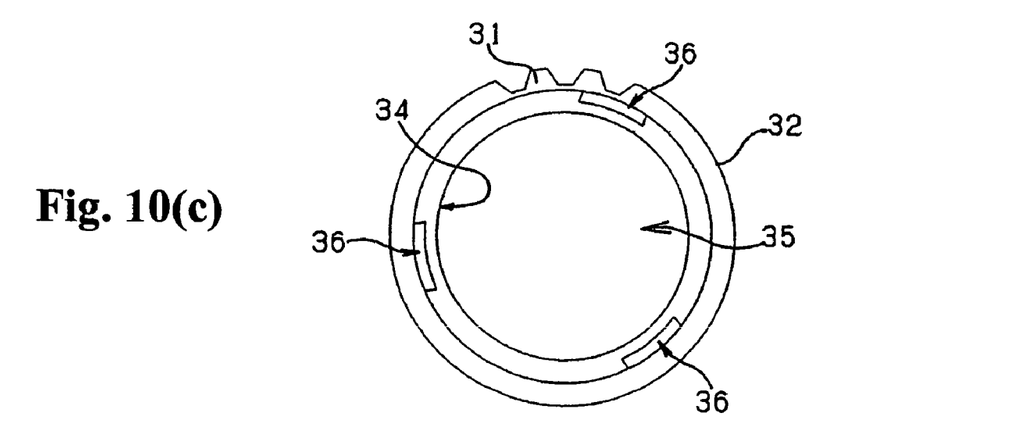
FIG. 10(c) illustrates a plan description view of FIG. 10(a)
Figure 11:
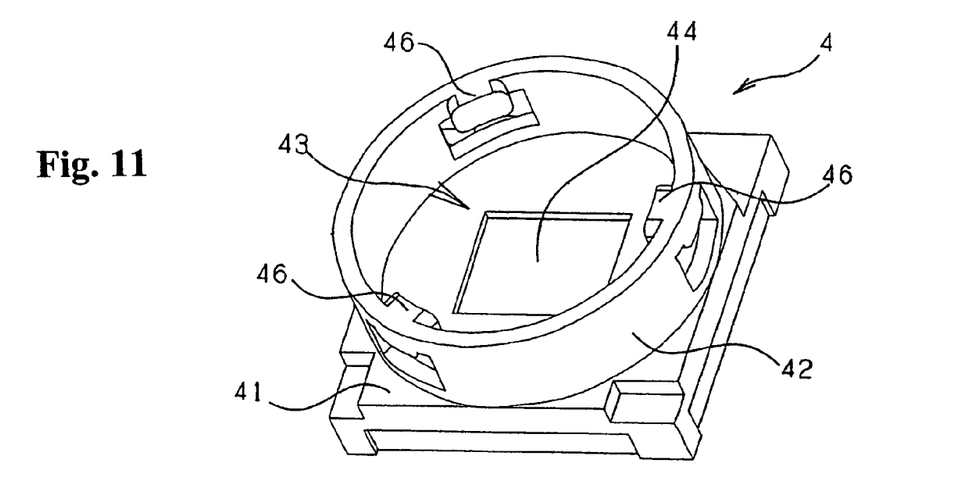
FIG. 11 is a perspective view of the base unit of the other embodiment.

While the motion of the intermediate part 3 and the base unit 4 in the light path X direction in accordance with the rotation is provided by the provisions of the latching protrusion 33 of the intermediate part 3 and the slide hole 45 of the base unit 4, it is accomplished by having a slide groove 36 provided in the intermediate part 3 instead of the slide hole 45 and a latching protrusion 46 provided on the base unit 4 in another embodiment shown in FIGS. 9 through 11.

The lens unit 2 has a screw thread 23 formed on the cylindrical surface of the housing 21 as in the previous embodiment. Other parts of the lens unit 2 in this embodiment are similar to the parts of the previous embodiment.

The intermediate part 3 can be operated easily by finger tips with a wavy area formed on the flange 32 shown in FIG. 9 and FIG. 10 instead of the operating lever 31 of the previous embodiment. A male screw thread 34 is formed on the inner cylindrical surface to be engaged with the lens unit 2 similar to the previous embodiment. Slide grooves 36, instead of latching protrusions 33, are formed on the outer cylindrical surface. Slide grooves 36 are provided on three locations 120° apart from each other. The slide grooves 36 starts at an entry part 36c located on the side of the base unit 4 that is opposite from the flange part 32 moving upward from there and then turning in the circumferential direction. Both ends 36a and 36b of the slide groove 36 provided in the circumferential direction is formed with a step similar to the slide hole 45 as in the previous embodiment. Other features of the intermediate part 3 are identical to those of the previous embodiment.

The base unit 4 has latching protrusions 46 formed at three locations to face the slide grooves 36 when the intermediate part 3 is located on the mounting part 43 as shown in FIG. 11. The shape of the mounting part 43 of the base unit 4 is formed in a cylindrical shape having an inner diameter approximately equal to that of the outer cylindrical shape of the intermediate part 3 so that the inner part 3 can be inserted. Other features of the base part 4 are identical to those of the previous embodiment.

In the camera module 1 constituted as described above, the lens unit 2 is mounted into the intermediate part 3 by means of engaging the screw thread 23 with the male screw thread 34 similar to the previous embodiment as shown in FIG. 9. Next, the entry part 36c of the slide groove 36 of the intermediate part 3 is matched with the latching protrusion 46 of the base unit 4, and then the intermediate part 3 is inserted inside the mounting part 43 of the base unit 4 with the latching protrusion 46 moving from the entry part 36c to the end part 36a.

When the latching protrusion 46, which is entered at the entry part 36c, reaches the end part 36a, the intermediate part 3 on which the lens unit 2 is mounted becomes capable of moving in the circumferential direction of the mounting part 43 with the latching protrusion 46 sliding along the slide groove 36. When the latching protrusion 46 slides along the slide groove 36 in the circumferential direction of the mounting part 43, the lens unit 2 moves by the distance in the light patch X direction provided between the ends 36a and 36b of the slide groove 36.

As can be seen from the above, the camera module 1 in the other embodiment can be switched between the normal usage condition and the macro usage condition as the lens unit 2 moves the step distance in the light path X direction provided in the slide groove 36 relative to the light receiving part 44 of the base unit 4.

Although the slide groove 36 is provided not to go through the cylindrical wall of the intermediate part 3 in the second embodiment, the slide groove 36 can be provided to go through only a portion of or the entire thickness of the wall.

INDUSTRIAL APPLICATION

The camera module according to the invention can be used as the lens units with macro functions for cellular telephones, digital cameras, or films with lens (so-called throw away cameras), as well as lens units for personal computers used for TV telephones.

Hence obvious changes may be made in the specific embodiment of the invention described herein, such modifications being within the spirit and scope of the invention claimed, it is indicated that all matter contained herein is intended as an illustrative and not as limiting in scope.

What is claimed is:

1. A camera module comprising:
   a lens unit having lenses allowing light to enter from one end, refract the light, and pass the light through to an opposite end;
   an intermediate part, cylindrically shaped, open on both ends, and receive the lens unit in a hollow part; and
   a base unit with an open end on one side having a mounting part holding the intermediate part in a freely rotatable manner;
   a latching protrusion, to latch with the base unit, is provided on an outer cylindrical surface of the intermediate part and;
   a slide hole having a step, to receive the latching protrusion provided on the intermediate part, is provided on a mounting part sidewall of the base unit;
   where the intermediate part moves relative to the base unit in a direction perpendicular to a rotary movement as the latching protrusion of the intermediate part moves along the slide hole of the base unit.

2. A camera module comprising:
   a lens unit having lenses to allow light to enter from one end, refract the light, and pass the light through to an opposite end;
   an intermediate part cylindrically shaped open on both ends and receive the lens unit in a hollow part; and
   a base unit with an open end on one side having a mounting part having the intermediate part in a freely rotatable manner;
   a latching protrusion, latching to the intermediate part, disposes on the mounting part sidewall of the base unit;
   a slide hole having a step, to movably fit the latching protrusion provided on the base unit, is provided on a side of the mounting part of the base unit;
   wherein the intermediate part can move relative to the base unit in a direction perpendicular to a rotary movement direction as the latching protrusion of the base unit moves along the slide hole of the intermediate part.

* * * * *